United States Patent [19]

Isaac et al.

[11] Patent Number: 4,520,845
[45] Date of Patent: Jun. 4, 1985

[54] HYDRAULIC DISTRIBUTORS

[75] Inventors: Olivier Isaac; Louis Pignolet, both of Lyons, France

[73] Assignee: Rexroth-Sigma, Venis Sieux, France

[21] Appl. No.: 445,922

[22] Filed: Dec. 1, 1982

[30] Foreign Application Priority Data

Dec. 3, 1981 [FR] France .............................. 81 22670

[51] Int. Cl.³ ........................................... F15B 13/01
[52] U.S. Cl. ........................ 137/624.27; 137/625.69; 137/625.68
[58] Field of Search ...................... 137/624.27, 625.68, 137/625.69

[56] References Cited

U.S. PATENT DOCUMENTS

| | | | |
|---|---|---|---|
| 3,476,148 | 11/1969 | McMillen | 137/624.27 |
| 3,698,434 | 10/1972 | Nelson | 137/624.27 |
| 3,939,870 | 2/1976 | Guigliano | 137/624.27 |

FOREIGN PATENT DOCUMENTS 2943316  5/1981  Fed. Rep. of Germany ....................... 137/624.27

*Primary Examiner*—Alan Cohan
*Attorney, Agent, or Firm*—Larson and Taylor

[57] ABSTRACT

Distributor comprising a body provided at least with one pressurized fluid inlet port (P), one return port for the fluid to a tank (T), two connecting ports (A, B) to a hydraulic apparatus or component, and a slide valve adapted to slide in a bore of the distributor body, and comprising locking means (B) for the slide valve and unlocking means actuated mechanically. The slide valve is formed of at least two parts assembled rigidly to one another and a pressure selector (S) is arranged inside the slide valve, this pressure selector comprising two inlets and an outlet, and being adapted to compare the two pressures on its inlets and to provide, at its outlet, the highest pressure, connecting means being provided in the distributor body and in the slide valve to connect the two inlets of the selector respectively to the two connecting ports (B, A) of the distributor, and to connect the outlet from the selector to a channel opening outside the distributor body. The distributor comprises means sensitive to the outlet pressure of the selector (S) adapted to control the actuation of the unlocking means when the outlet pressure of the selector (S) passes through a predetermined limit.

8 Claims, 5 Drawing Figures

HYDRAULIC DISTRIBUTORS

BACKGROUND OF THE INVENTION

The invention relates to a hydraulic distributor of the type which comprises a body provided with at least one inlet port for pressurised fluid, a port to return the fluid to a tank, two ports connecting to a hydraulic apparatus or component, and a slide valve adapted to slide in a bore of the distributor body, the body and the slide valve comprising passages, channels and/or grooves arranged so as to co-operate in order to establish the desired connections or closures of the different ports of the distributor body, according to the position occupied by the slide valve, this distributor comprising locking means for the slide valve in its working and resting positions, and unlocking means actuated mechanically on the movement of the slide valve.

PRIOR ART

In certain hydraulic assemblies, particularly when it is desired to control a variable displacement pump in order to adjust the power supplied by this pump with the power absorbed by the hydraulic apparatus controlled by the distributor, it is convenient to have a pilot pressure available equal to the highest pressure present at the connecting ports of the one or several distributors used in a group.

It is desirable, in addition, for the unlocking means of the slide valve in its working positions to come into play when the highest of the pressures present at the connecting ports becomes too high.

GENERAL DESCRIPTION OF THE INVENTION

It is a particular object of the invention to provide a hydraulic distributor of the previously defined type which enables the exigencies mentioned above to be satisfied whilst remaining simple to manufacture and robust, and whilst preserving a small bulk.

According to the invention, a hydraulic distributor of the type concerned is characterised by the fact that on the one hand, the slide valve is constructed of at least two parts assembled to one another and a pressure selector is arranged inside the slide valve, this pressure selector comprising two inlets and one outlet, and being adapted to compare the two pressures at its inlets and to provide, at its outlet, the highest pressure, connecting means being provided in the distributor body and in the slide valve to connect the two inlets of the selector respectively to the two connecting ports of the distributor, and to connect the outlet from the selector to a channel opening outside the distributor body and wherein, on the other hand, the distributor comprises means sensitive to the outlet pressure of the selector adapted to control the actuation of the unlocking means when the outlet pressure of the selector passes through a predetermined limit.

The pressure sensitive means may comprise a piston or the like housed in a chamber and adapted to act on the unlocking under the effect of the outlet pressure of selector, and a channel system adapted to connect the chamber of the selector to the chamber wherein the piston is located.

This channel system is advantageously constructed by means of an ensleeved part, particularly force-fitted, in a bore of the part of the slide valve comprising the chamber, this part comprising a widened head situated in this chamber, the seat for the ball of the selector being provided on this head, the outer diameter of said head being less than the inner diameter of the chamber of the selector so that an annular passage is formed between the head and the inner surface of the chamber, this annular passage being connected by a space, provided between an extension of the part and the bore of the slide valve in which this extension is engaged, to the chamber in which the unlocking piston is located; the seat provided in the widened head of the part is connected by channels provided in this part and on its outer surface, with a radial channel of the slide valve adapted to be placed in communication with an outlet port or a connecting port of the distributor.

The distributor can comprise a fluid-tight valve provided at an outlet port, of which valve the opening can be controlled by the slide valve on its movements; this slide valve then advantageously includes a diametric transverse passage communicating with a longitudinal channel of the slide valve, the assembly being such that, in the neutral position of the slide valve, this diametric passage establishes a connection of the chamber of the body of the distributor, closed by the fluid-tight valve, with the port connected to the tank, whilst on the movement of the slide valve in the direction intended to cause the opening of the fluid tight valve, the abovesaid diametric passage is closed at the start of the movement.

BRIEF DESCRIPTION OF THE DRAWINGS

The invention consists, apart from the abovedescribed features, of the certain other features which will be more explicitly discussed below with respect to a particular embodiment described with reference to the accompanying drawings, but which is in no way limiting.

Lastly.

DESCRIPTION OF THE PREFERRED EMBODIMENTS

Figures 1, 2:
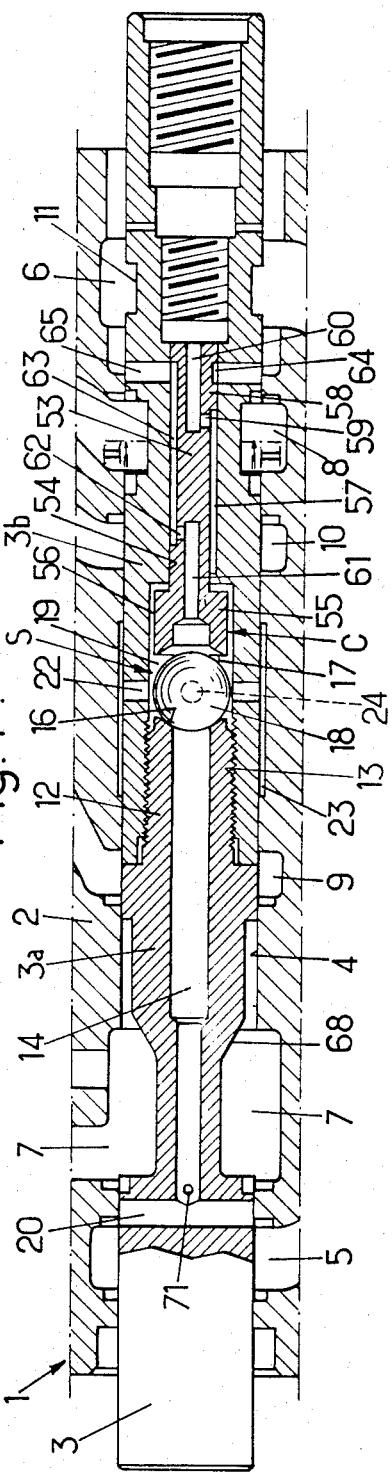
FIG. 1, of these drawings, is partial axial cross-section at the level of the slide valve, of an embodiment of a distributor according to the invention.
FIG. 2 is a section along the line II—II, of FIG. 1.
Figure 3:
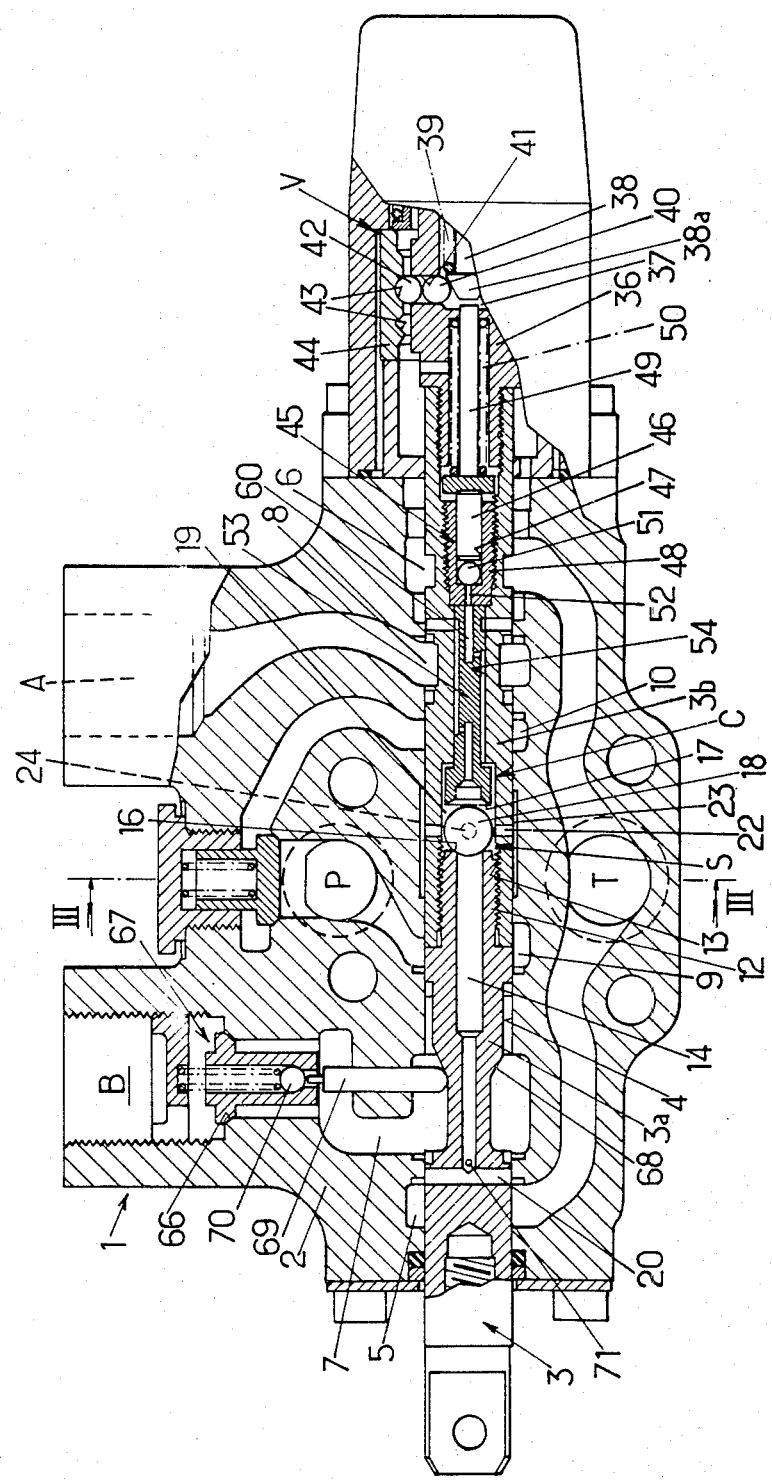
FIG. 3 is a longitudinal section, with parts at the outside, of a distributor comprising a fluid tight valve on one of its connecting ports.

Referring to the drawings, particularly to FIGS. 1 and 3, a hydraulic distributor 1 can be seen comprising a body 2 provided, at least, with a port P (FIG. 3) for the intake of pressurised fluid, a port T for the return of fluid to a tank and two connecting ports A, B to a hydraulic apparatus or component such as a jack or a rotary motor.

The distributor also comprises a slide valve 3 adapted to slide in a bore 4 of the body of the distributor.

The body 2 and the slide valve 3 comprise passages, channels and/or grooves arranged so as to cooperate in order to establish the desired connections or closures of the various ports P, T, A and B of the distributor, according to the position occupied by the slide valve. It is not necessary to describe these passages, channels, grooves in detail, which are quite apparent from FIGS. 1 and 3. One may, however, specify that the body 2 comprises towards each of its longitudinal ends, a cavity 5, 6, connected to the port T as seen in FIG. 3; the cavities 5 and 6 are traversed by the bore 4. Two cavities 7 and 8 connected respectively to the connecting ports B and A are provided between the cavities 5 and 6 and the middle region of the body 2. Two other cavities 9 and 10 are provided, in the body 2, between the cavities 7 and 8 and the middle region of this body; the cavities 9 and 10 are connected by channels to the port P.

The cavities 7, 8, 9 and 10 are traversed by the bore 4.

The slide valve 3 is constructed in two parts 3a, 3b rigidly assembled to one another, and a pressure selector S is arranged inside the slide valve. The two parts 3a, 3b are screwed into one another, the part 3a comprising an extension 12 of smaller diameter, externally threaded, screwed into a tapped housing 13 provided in the other part 3b.

After the positioning of the selector S inside the slide valve, two parts 3a, 3b are screwed and locked in one another and assembled finally, particularly by adhesive. A finishing machining (trueing) is carried out on the slide valve so assembled, which then undergoes chroming.

Each part 3a, 3b comprises a longitudinal axial channel respectively 14, 54 having one end open towards the other part of the slide valve and arranged in the form of a seat, particularly frustoconic, respectively 16, 17 for a ball 18 belonging to the selector. The axial channel 54 of the part 3b comprises beyond its seat 17, and towards the part 3a, a widened zone adapted to serve as a chamber 19 for the ball 18; the tapped housing 13 extends this chamber 19 towards the part 3a. The inner diameter of the chamber 19 is greater than the diameter of the ball 18.

The two seats 16, 17 constitute the two inlets of the selector adapted to be connected to the connecting ports B and A respectively by the axial channels 14 and 61, 63, and by the radial channels 20, 65 provided at the blind end of each axial channel and connecting this axial channel to the periphery of the slide valve 3.

The outlet from the selector S comprises one or several radial channels such as 22 connecting the chamber 19 to the outer surface of the slide valve 3. These channels 22 open into a cylindrical clearing 23 provided in the bore of the body 2; this clearing 23 has a length at least equal to the stroke of the slide valve so as to remain in constant communication with the outlet 22 from the selector S.

The cylindrical clearing 23, and hence the outlet 22 from the selector S, are coupled by a channel 24 (FIG. 1) opening outside the body of the distributor.

The selector S compares the pressures at the inlet 16, 17, that is to say the pressures at the connecting ports B and A when communication of the axial channels 14, 54 with these ports is established for an operating position of the slide valve 3. The ball 18 is repelled, by the stronger pressure, against the seat 16 or 17 of the channel connected to the weakest pressure, and closes this channel. The highest pressure is thus available at the outlet of the selector (chamber 19 and channel 22) and hence in the clearing 23. In neutral position of the slide valve 3, the chamber 19 of the selector is connected to the tank through the channels 20, 65 which communicate with the cavities 5 and 6.

The distributor body 2 has a generally parallelepipedic shape whose large sides are parallel with the longitudinal axis of the slide valve 3. This body 2 has two flat faces parallel with one another as well as with the axis of the slide valve 3. These faces enable the stacking of several distributors flat surface against flat surface.

Figure 4:
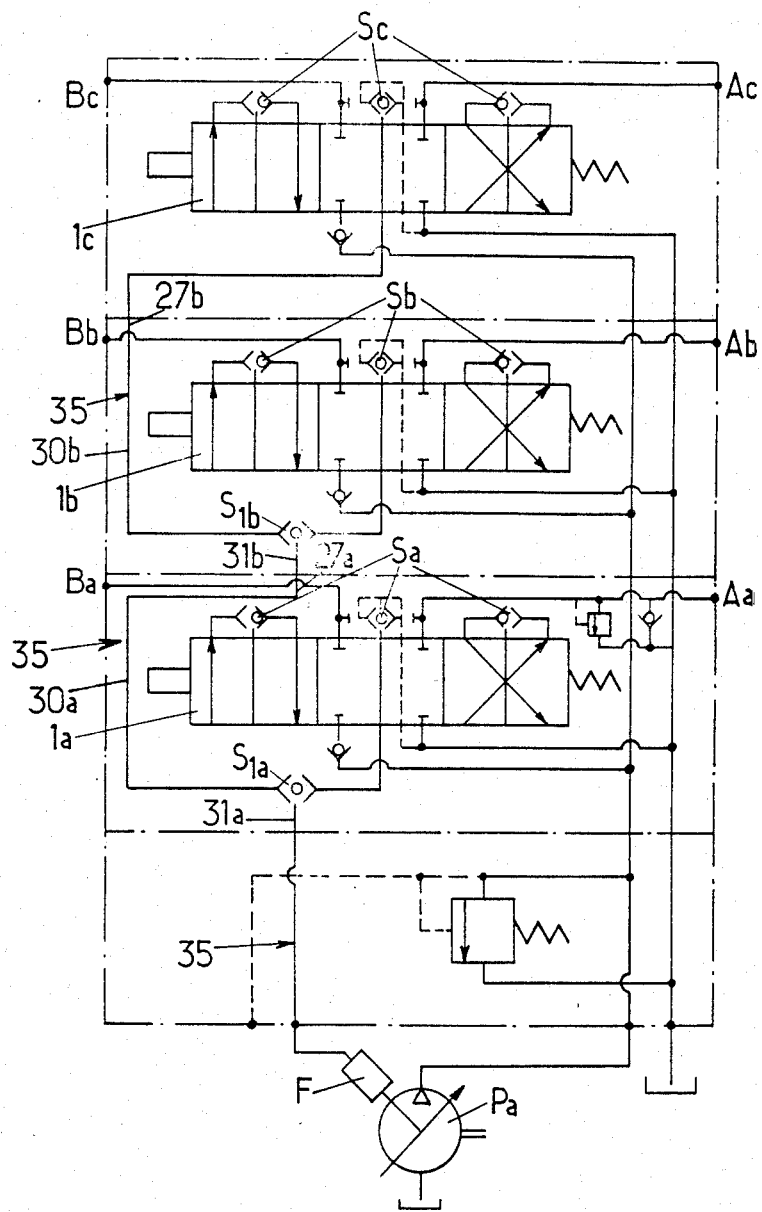
FIG. 4 is a distribution diagram with three distributors according to the invention supplied with pressurised fluid by a variable displacement pump, with piloting of the displacement of the pump.
Figure 5:
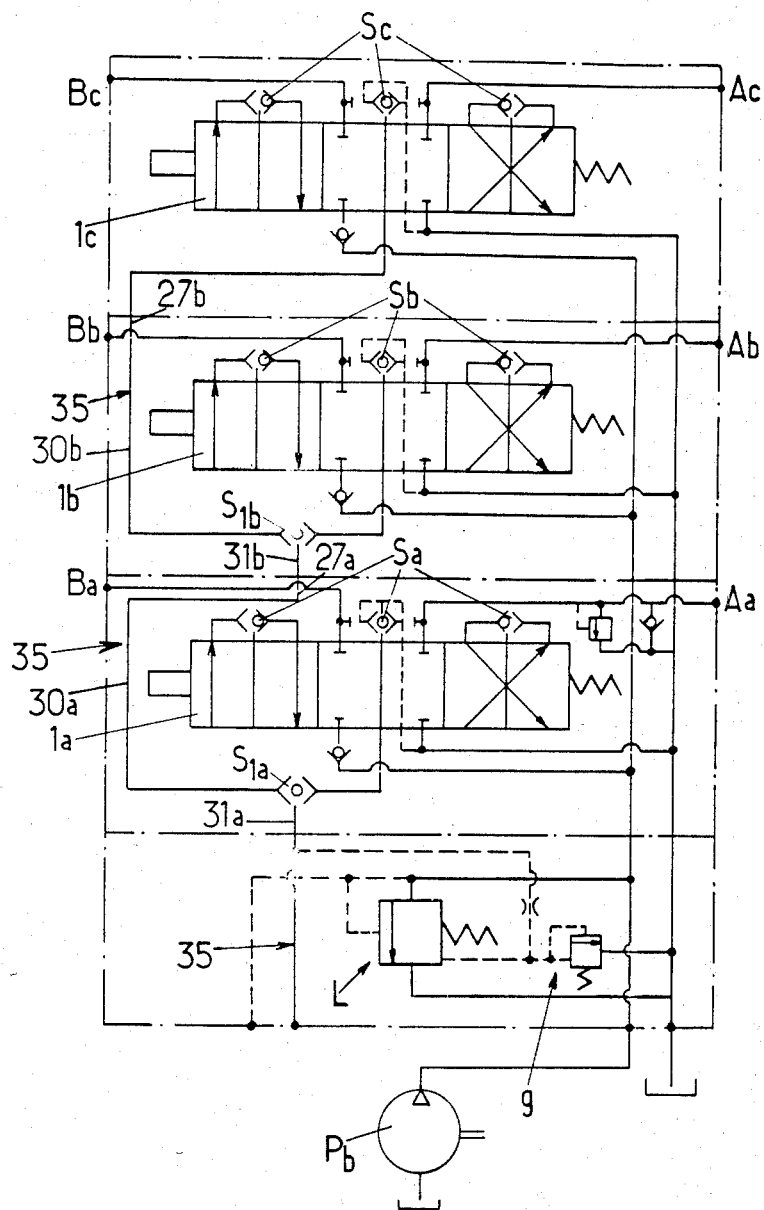
FIG. 5, is a distribution diagram with three distributors supplied by a fixed displacement pump, with piloting of the pressure limiter of the pump.

In the case where several distributors such as 1a, 1b, 1c (see FIGS. 4 and 5) are combined, there are provided in addition to the first selector $S_a$, $S_b$, $S_c$ of each distributor a second selector such as $S_{1a}$, $S_{1b}$ associated with a distributor 1a, 1b (FIGS. 4 and 5).

The second selector, such as $S_{1a}$ or $S_{1b}$ (FIG. 4) compares the outlet pressure from the first selector $S_a$ or $S_b$ of an associated distributor (1a or 1b), with another pressure transmitted through a passage such as 27a or 27b. The second selector such as $S_{1a}$ or $S_{1b}$ provides the highest pressure at its outlet and at a port such as 31a or 31b (FIG. 4).

The second selector such as $S_{1a}$ or $S_{1b}$ may be located either outside the body of the distributor, or in the distributor body.

The pressure transmitted by the passage 27a, 27b of the second selector 31a, 31b may be formed by the highest pressure from one or from several other distributors connected to the same pressure source constituted, for example, by a variable displacement pump.

By stacking several distributors, the port 31b of one distributor 1b comes into communication with the passage 27a of the neighbouring distributor.

The diagram of FIG. 4 illustrates such an assembly with three distributors 1a, 1b, 1c with three positions, connected in parallel to a variable displacement supply pump $P_a$. Various conventional hydraulic components are illustrated in this diagram and it would not appear necessary to describe them in detail, their symbolic representation being sufficient to identify them.

The elements or parts of these distributors similar to the parts already described are denoted by the same reference numerals followed by indices a, b or c; the description of these parts or elements will not be repeated.

To be noted essentially is the presence of a pilot line 35 enabling the displacement of the pump $P_a$ to be controlled according to the highest pressure demanded at one of the connecting ports of the three distributors.

This pressure line or pipe comprises pipes 30a 30b for 1a and 1b. It connects the outlet of the selector $S_c$ (first selector of the first distributor 1c) to an inlet from $S_{1b}$ (second selector of the distributor 1b). The other inlet of this selector $S_{1b}$ is connected to the outlet of the first selector $S_b$ of 1b.

The line 35 then connects, the outlet from $S_{1b}$ to an inlet of the second selector $S_{1a}$ of the first distributor 1a. The other inlet of $S_{1a}$ is connected, as explained previously, to the outlet of the first selector $S_a$ of the distributor 1a.

The line 35 lastly, connects the outlet of $S_{1a}$ to the control device F of the displacement of the pump.

It will also be noted in the diagramatic drawing, that the first selectors $S_a$, $S_b$ or $S_c$ have been shown three times, in correspondence with each diagramatic box of the distributor.

Referring to FIG. 3, it is seen that the distributor 1 comprises a locking device V of the slide valve in its various positions. This locking device V is conventional and it is not necessary to describe it in detail. It will simply be noted that a part 36 is screwed to one end of the slide valve 3; this part comprises an axial housing 37 in which can slide a rod 38 provided with a frustoconic head 38a and thrust by a spring 39 towards the slide valve 3. The frustoconic head 38a co-operates with a ball 40 engaged in a transverse hole 41 passing through the wall of the housing 37. A second ball 42, thrust by the ball 40, projects on the outer surface of the part 36 so as to co-operate with locking grooves such as 43 provided inside a sleeve 44 locked to the body 2. A movement of the rod 38, towards the right in the drawing of FIG. 3, against the spring 39, enables withdrawal of the balls 40 and 42 towards the inside of the housing 37, in the radial direction, and the unlocking of the slide valve 3. This withdrawal may be produced mechanically by an operator by exerting on the slide valve 3 an axial force sufficient to cause such a withdrawal of the rod 38 under the influence of the radial thrust exerted by the balls on the frustoconic head.

Means 45 sensitive to the outlet pressure of the first selector S are provided to control the actuation of the unlocking when the outlet pressure of the selector S passes through a predetermined limit. These means 45 comprise a piston 46 housed in a chamber 47 arranged in a sleeve 48 screwed into a tapped hole of the slide valve 3. By its end remote from the centre of the distributor, the piston 46 thrusts against the head of a push-rod intended to transmit the force to the rod 38. This push-rod is held by elastic return means 50 in contact with the piston 46. For the fully inserted position of the piston 46 into the chamber 47, as shown in FIG. 3, the push-rod 49 is spaced from the rod 38.

A ball 51 is arranged between the end of the piston 46 turned towards the centre of the distributor and the bottom of the chamber 47. This bottom is traversed by an axial channel 52 of diameter very much less than that of the chamber 47. The ball 52 is adapted to close this channel under the force of elastic means 50, which force is transmitted through the head of the push-rod 49 to the piston 46 and to the ball. A channel system C is provided to connect the outlet from the selector S to the channel 52 and hence to the chamber 47.

This channel system C, clearly seen in FIG. 1, is formed by means of a part 53 ensleeved, particularly force-fitted, into the bore 54 of the part 3b of the slide valve comprising the chamber 19. The part 53 comprises a widened head 55, of greater diameter than that of the part ensleeved in the bore 54. This head 55 is situated in the chamber 19 whose axial length is greater than that provided in the case of FIG. 1. The outer diameter of the head 55 is less than the inner diameter of the chamber 19 so that an annular passage 56 is formed between the head and this inner surface. This annular passage 56 is connected to a space 57, forming a channel with the cross-section of a circular segment (see FIG. 2); this space corresponds to a clearance with a flat bottom formed on the cylindrical part 53 (FIG. 2).

As is visible in FIG. 1, the space 57 only extends over a fraction of the axial length of the part 53 and is closed at 58 by the normal contour of this part 53. A transverse hole 59 is provided to connect the space 57 to an axial channel 60 which opens at the end of the part 53 turned towards the sleeve 48 and the locking means V (see FIG. 3). This channel 60 communicates with the other axial channel 52 as seen in FIG. 3. The pressure existing in the chamber 19 of the selector, and hence the pressure at the outlet of this selector, is thus transmitted to the channel 52 and is exerted on a surface of the ball 51, corresponding to the cross-section of the channel 52 against the force developed by the spring 50. When this pressure exceeds a predetermined value, the ball 51 is moved away from its seat and the liquid pressure is established over the whole cross-section of the chamber 47. Due to the fact that the cross-section of this chamber 47 is largely superior to the cross-section of the channel 52, the force which is exerted on the piston 46 becomes largely superior to that which has caused the disengagement of the ball 51 from its seat and a free movement of the piston 46 against the spring 50 is produced. The push-rod 49 repels the rod 38 and its frustoconic head 38a against the spring 39 and the balls 40, 42 withdraw inwardly in the radial direction, which unlocks the slide valve 3 which is restored by elastic means (not seen in FIG. 3), into its neutral position.

The seat 17 of the ball 18 of the selector S (see FIG. 1) which is provided at the end of the enlarged head 55 as previously indicated, is extended towards the inside of the part 53 by the blind axial channel 61. Towards its closed end, this channel 61 communicates through a radial hole 62 with the space 63 (see FIGS. 1 and 2) of cross-section in the form of a circular segment. The space 63, similar to the space 57 described previously, extends over a fraction of the length of the part 53, to the periphery of the latter. This space 63 is formed by a clearance with a flat bottom formed on the part 53 and is limited by the inner surface of the bore 54. A peripheral groove 64 is provided on the part 53 at the level of the longitudinal end, distant from the centre of the slide valve 3, of the space 63. At this same longitudinal level are provided, in the wall of the part 3b of the slide valve radial channels 65 forming a communication of the groove 64 and the space 63 with the outer surface of the slide valve 3. The longitudinal position of the grooves of the slide valve 3 and of the radial channels 65 is selected so as to ensure the following connections. When the slide valve 3 occupies the working position ensuring the coupling between the cavities 8 and 9 through one of the grooves of said slide valve, the channels 65 open into the cavity 8 and hence ensure the placing of the seat 17 in communication with the chamber 8. When the slide valve 3 occupies its other working position for which one of its grooves places the cavity 8 in communication with the cavity 6, the radial channels 65 open into the cavity 6. In the neutral position of the slide valve 3, for which the cavity 8 is isolated from the cavities 10 and 6, the radial channels 65 open into the cavity 6 and hence ensure the connection of the seat 17 with the port T and the tank.

The operation of unlocking the distributor according to FIGS. 1 and 3 will be immediately apparent from the preceding explanation.

When the slide valve 3 occupies a working position (moved towards the left with respect to that shown in FIG. 1), ensuring the admission of pressurised fluid into the cavity 8 and to the port A, this pressurised fluid passes through the channels 65, the space 63, the hole 62 and the channel 61 to arrive against the ball 18. Since the other connecting port B is then connected to the tank return port T, the ball 18 of the selector S becomes urged by the pressure against the other seat 16 which is thus closed.

The liquid pressure is hence established in the chamber 19 which may be considered as forming, with the port 22, the outlet from the selector S. This liquid under pressure flows through the passage 56, the space 57, the hole 49 and the channel 60, towards the ball 51 (FIG. 3).

When the pressure of the liquid exceeds a certain value, as explained previously, the ball 51 is separated from its seat and the piston 46 actuates the unlocking of the slide valve 3.

Referring again to FIG. 3, it is seen that the distributor 1 may include a sealing valve 67 provided on the outlet port B, having a seat 66, of which valve the opening can be actuated by the frustoconic portion 68 of the slide valve 3 on its movement, this frustoconic portion co-operating with a push-rod 69 adapted to move a ball 70 subjected to a relatively slight force due to the fact of the small cross-section on which the pressure difference is exerted. The movement of the ball 70 permits the equalibration of pressure on each side of the valve 67 and the subsequent opening of this valve with a slight force.

When such a valve 67 is combined with a distributor according to the invention, there is advantageously provided in the slide valve 3, a diametric passage 71 which communicates with the axial channel 14 of the part 3a towards the blind end of this channel 14. The passage 71 is situated on the side of the central portion of the slide valve 3 with respect to the radial channel 20.

The longitudinal position of this diametric passage 71 is selected so that when the slide valve 3 is in neutral position, for which the grooves provided at the periphery of the slide valve do not establish a connection between the cavity 7 and the cavity 5 connected to the port T, the passage 71 communicates with this cavity 7, whilst the radial channel 20 communicates with the cavity 5. Thus it is seen that a connection is established between the cavity 7 and the port T through the passage 71, the channel 20 and the cavity 5.

This connection enables the cavity 7 to be depressurized in the case where leakages would be produced between the slide valve 3 and the bore 4, from the pressurized cavity 9 towards the cavity 7.

The position of the passage 71 is, in addition, selected so that on the movement of the slide valve 3 in the direction intended to cause the opening of the valve 67, that is to say on the movement of the slide valve 3 towards the left in the case of FIG. 3, the above-said passage 71 is closed by a bearing surface of the bore of the distributor body whilst the rod 69 is lifted by the frustoconic portion 68. The cavity 7 is thus isolated from the port T and the pressure in this cavity 7 can increase when the ball 70 is disengaged from its seat, until equilibration of the pressure at the port B, since there is no leakage flow through the passage 71. Such flow would cause a pressure drop through the valve 67 and would render the opening of this valve more difficult.

When the movement of the slide valve continues towards the left of FIG. 3, the passage 71 then enters into communication with the cavity 5, but then the valve 67 is already open.

The distributor according to the invention is of simple and robust manufacture and of small bulk. The layout of the passages inside the body 2 corresponds substantially to the layout of a conventional distributor, which reduces manufacturing costs.

It is clear that the distributor of the invention which enables, as shown in the diagram of FIG. 4, the control of a variable displacement pump to be effected, may also be used with a fixed displacement pump; in this case, as seen in FIG. 5, it suffices to connect the port 31a to the control device g of the pressure limiter L of the fixed displacement pump $P_b$, in order to control the opening of the valve of said limiter to by-pass to the tank, the excess flow from the pump.

We claim:

1. A hydraulic distributor comprising:

a body provided at least with one pressurised fluid inlet port, one return port for returning the fluid to a tank, two connecting ports connecting with a hydraulic apparatus or component, and a slide valve adapted to slide in a bore of the distributor body;

the body and the slide valve including passages, channels and/or grooves arranged so as to cooperate to establish the desired connection or closure of the various ports of the distributor body, according to the position occupied by the slide valve;

this distributor comprising locking means for the slide valve in its working and resting positions, the locking means actuated mechanically on the movement of the slide valve;

wherein, on the one hand, the slide valve is constructed of at least two parts assembled to one another and a pressure selector is arranged inside the slide valve, this pressure selector comprising two inlets and one outlet, and adapted to compare the two pressures on these inlets and to supply, at its outlet, the highest pressure; coupling means being provided in the distributor body and in the slide valve to couple the two inlets of the selector respectively to the two connecting ports of the distributor, and to connect the outlet of the selector to a channel opening outside the distributor body;

and wherein, on the other hand, the distributor includes means sensitive to the outlet pressure of the selector adapted to control the actuation of the unlocking means when the outlet pressure of the selector passes through a predetermined limit.

2. Distributor according to claim 1, wherein the pressure sensitive means comprise a piston or the like housed in a chamber and adapted to act on the unlocking means under the effect of the outlet pressure from the first selector, and a channel system adapted to connect the outlet from the selector to the chamber where the piston is located.

3. Distributor according to claim 2, wherein the piston is housed in a chamber whose cross-section is greater than the cross-section of a channel, closed by a ball urged by the piston, for the introduction of pressurised fluid into the chamber.

4. Distributor according to claim 3, wherein the channel system is formed by means of an ensleeved part, particularly with force, in a bore of the part of the slide valve comprising a chamber, this part comprising a widened head situated in this chamber, the seat for the ball of the selector (S) being provided on this head, the outer diameter of said head being less than the inner diameter of the chamber of the selector so that an annular passage is formed between the head and the inner surface of the chamber.

5. Distributor according to claim 4, wherein the annular passage is connected by a space, provided between an extension of the part and the bore of the slide valve in which this extension is engaged, to the chamber in which the unlocking piston is located, the seat provided in the widened head of the part being connected by channel means provided in this part and on its outer surface with a radial channel of the slide valve adapted to be placed in communication with an outlet port (T) or a connecting port (A) of the distributor.

6. Distributor according to claim 1, wherein the two parts of the slide valve are screwed into one another and locked, particularly by adhesion, to undergo, then, a finishing machining.

7. Distributor according to claim 1, comprising a fluid-tight valve provided on an outlet port, of which valve the opening is controllable by the slide valve on its movements, wherein this slide valve comprises a diametric transverse passage communicating with a longitudinal channel of the slide valve, the assembly being such that, in the neutral position of the slide valve, this diametric passage establishes a connection of the chamber of the distributor body, closed by the fluid-tight valve, with the port (T) connected to the reservoir, whilst on the movement of the slide valve in the direction intended to cause the opening of the fluid-tight valve, the above-said diametric passage is closed at the beginning of the movement.

8. Distributor according to claim 1 wherein one port of the two part slide and associated bore includes passages, channels and/or grooves arranged to provide fluid communication from the inlet port to one of the connecting ports and from the one of the connecting ports to the return port, and wherein the other port of the two part slide and associated bore includes passages, channels and/or grooves arranged to provide fluid communication from the inlet port to the other of the connecting ports and from the other of the connecting ports to the return port.

* * * * *